June 27, 1967 R. C. HEDIN 3,327,960

TAPE REEL

Filed May 9, 1966

INVENTOR
ROLAND C. HEDIN
BY
Carpenter, Kinney & Coulter
ATTORNEYS 3,327,960
Patented June 27, 1967

3,327,960

TAPE REEL

Roland C. Hedin, Mahtomedi, Minn., assignor to Minnesota Mining and Manufacturing Company, St. Paul, Minn., a corporation of Delaware Filed May 9, 1966, Ser. No. 548,498
5 Claims. (Cl. 242—71.8)

ABSTRACT OF THE DISCLOSURE

A reel having flanges which are preferably plastic and a hub which is preferably a single piece of metal. Assembly of the reel is accomplished simply by means of a resilient beaded annular rib on each flange which deflects and then snaps into interlocking relationship with an annular detent on the hub.

This invention relates to a reel for mounting magnetic recording tape and the like.

Tape reels in general have a hub and flanges. These parts are made separately for various reasons, e.g., it is desirable to mold the flanges out of lightweight and inexpensive plastic, whereas it is desirable to make the hub out of metal or other material with which very close tolerances can be kept. Also, the configuration of the reel makes it very difficult to form it as an integral unit.

Thus, the two flanges are conventionally molded as separate pieces and the hub is made as a third separate piece, and the pieces are then adhesively bonded together. Adhesive bonding is a fast and inexpensive means for interconnecting the reel pieces, but has a number of disadvantages. For example, the pieces have to be carefully assembled and held together while the adhesive sets. Furthermore, the different materials of the hub and flanges may not be compatible with the same adhesives and cause difficulties in getting the desired secure bonding.

A number of constructions have been proposed to alleviate these disadvantages. For example, the flanges have been designed with mating parts that extend through the hub and lap each other as in Burgess et al., Patent No. 3,229,928. The flanges are thus bonded directly together and trap the hub in between. It is, however, desirable that the close tolerances be maintained at both the inner and outer diameter of the hub, and thus in the preferred structures incorporating this feature, the overlapping parts extend through openings in the hub so that both inside and outside diameters are comprised entirely of the hub material.

Although such reels are considered as being improvements in several respects, forming the more intricate pieces and assembling them together is more difficult and time consuming, and accordingly, more expensive. I have achieved the desired improvements of such reels, while avoiding the above disadvantages, by designing the hub and flanges to be mechanically assembled. In my preferred structure, very generally, a central annular rib on each flange is provided with locking beads which snap over mating detents of the hub. The parts are easy to make and are quickly and securely assembled together to form the desired reel.

As far as I am aware, no one has heretofore utilized mechanical fastening in the manner disclosed herein for assembling the components of a tape or film reel. The invention and its advantages are more specifically disclosed in the following detailed description and drawing wherein.

Figure 1:
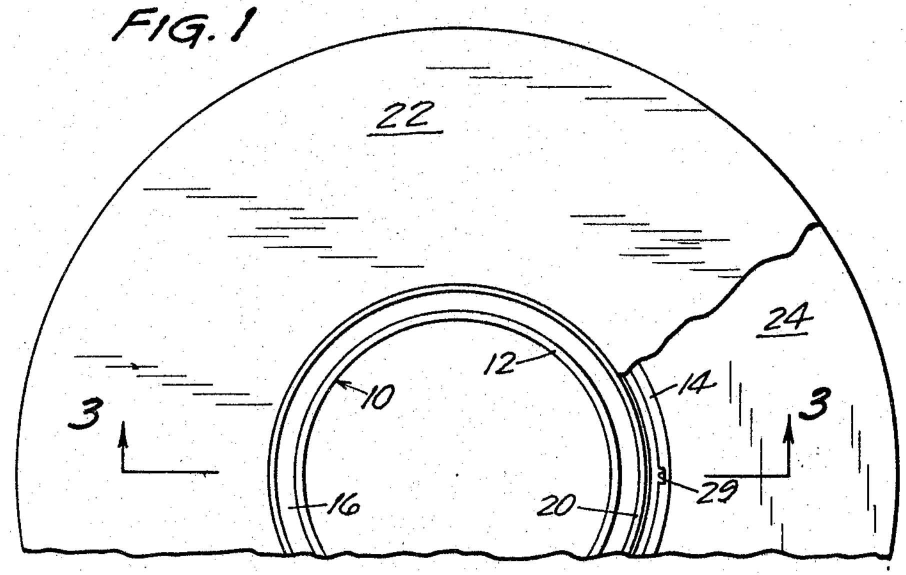
FIG. 1 is a partially sectioned view of one side of a tape reel in accordance with my invention.
Figure 2:
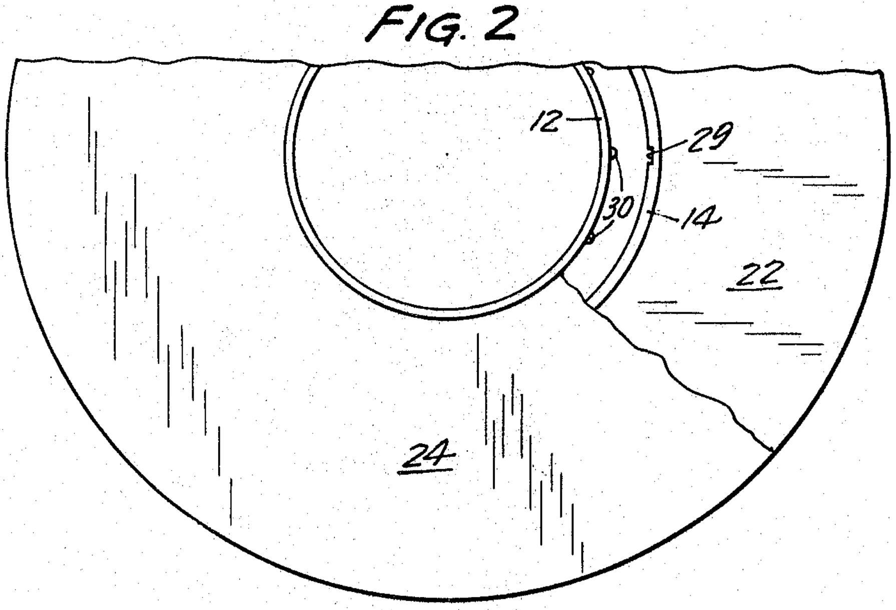
FIG. 2 is a partially sectioned view of the other side of the tape reel illustrated in FIG. 1.
Figure 3:
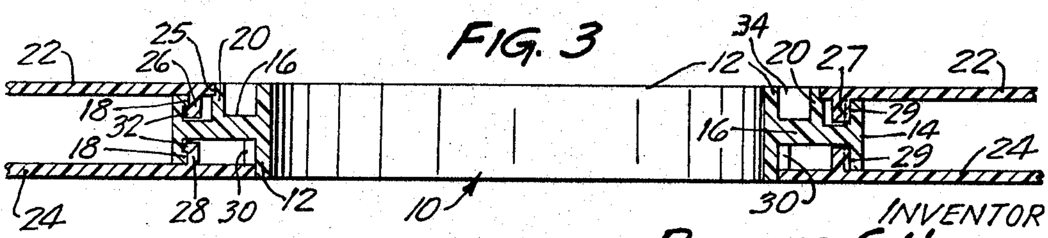
FIG. 3 is a cross-sectional view taken on line 3—3 of FIG. 1.

Referring to the drawing, a hub 10 made from a suitable metal material (e.g. aluminum) or fiber-filled plastic or the like, is formed with a cross-section as shown in FIG. 3 comprising an annular band 12 and a cylindrical tape-receiving rim 14 interconnected by a web 16. An annular detent 18 extends radially inwardly from each edge of the rim 14. An annular partition 20 parallel to the band 12 and rim 14 extends from one side of the web 16 midway between the band 12 and rim 14.

A pair of circular flanges 22 and 24 made of resilient plastic or the like have laterally projecting annular ribs 26 and 28. Each flange has a central circular opening but with the opening of flange 22 having a radius slightly smaller than the outside radius of the partition 20, and the opening of flange 24 having a radius equal to the outside radius of the band 12. The edge of the partition 20 is provided with a peripheral notch 25 into which the flange 22 fits at its central opening. Bosses 30 on the radially outer surface of the band 12 are inset from the edge of the band 12 a distance equal to the width of the flange 24.

Each of the ribs 26 and 28 has a bead 32 extending radially outwardly from the rib. The ribs 26 and 28 are located on the respective flanges 22 and 24 so that when the flanges are positioned on the hub, beads 32 are brought into abutting contact with the detents 18 on the rim 14 of the hub. Because the outer edges of beads 32 are biased and the material of the flanges is resilient, the ribs 26 and 28 will deflect sufficiently when gently forced against the hub to allow the beads 32 to by-pass the detents 18 and become interlocked therewith as illustrated in FIG. 3.

In one or more locations where flanges 22 and 24 abut against the rim 14, keys 27 are molded as an integral part of flanges 22 and 24 to mate with keyways 29 that are fabricated into the rim 14. This serves to lock flanges 22 and 24 onto the rim 14 against rotative movement.

The cylindrical rim 14 of the hub is narrower than the annular band 12 by the thicknesses of the flanges. With the flanges mounted on the hub having the inner edge of the flange 22 in the notch 25 and the inner edge of flange 24 abutted against the bosses 30 and with beads 32 and detents 18 interlocked, the outer faces of the flanges are substantially flush with the band 12 and the partition 20. Thus the notch 25 in the partition 20 on one side of the hub, and the bosses 30 and band 12 on the other side support the flanges 22 and 24 and cooperate with the interlocking beads 32 and detents 18 to maintain the flanges essentially perpendicular to the tape receiving rim 14. The band 12 is free to provide accurate surfaces for mounting the reel.

Channel 34 is provided in the reel as a safety feature to avoid double recording of a computer tape. Thus it is common to provide recorders with a feeler switch. The feeler switch is designed to project from the recorder into the channel. When the desired information is fed onto the tape, a lock out ring (not shown) is inserted into the channel. If the reel is then placed on the recorder, the feeler switch will be deflected by the lock out ring and the recorder turned off.

Although this safety feature is not new, it is believed new to provide the walls of the channel as integral projections from the hub, thus taking advantage of the closer tolerances realized from the material of which the hub 10 is constructed. It is understood that numerous variations are contemplated herein and that my invention is not limited to the specific construction described above. Thus, whereas the mechanical locking of the flanges and hub is secure, it may be desirable to insure rigidity of the construction by additionally incorporating adhesive. Of course advantages are still realized by the mechanical interconnection, as for example, the parts are immediately mechanically locked together and held in the desired position while the adhesive sets. My invention is thus determined by the following claims.

What I claim is:

1. A reel useful for storing tape comprising a hub and a flange mechanically interlocked to one side of the hub and extending radially outwardly from the hub,
   (1) said flange having
      (a) a central annular rib protruding into the hub and
      (b) a bead extending radially from said rib;
   (2) said hub having
      (a) a cylindrical tape-receiving rim coaxial with said annular rib and abutting said flange,
      (b) an annular detent interlocking with said bead,
      (c) annular means for supporting said flange along a circle coaxial with and radially offset from said annular rib to cooperate with said interlocking bead and detent in maintaining the flange essentially perpendicular to the tape-receiving rim, and
      (d) a radially extending web interconnecting said rim, detent and flange-supporting means;

said rib and said detent being so constructed that during assembly of the flange to the hub, the rib deflects radially relative to the detent to allow its bead to by-pass and interlock with the detent.

2. A reel as defined in claim 1 wherein the annular detent extends radially inwardly from one edge of the rim, and the flange-supporting means is located radially inwardly from the detent.

3. A reel useful for storing tape comprising a one-piece metal hub and a circular flange mechanically interlocked to each side of the hub and extending radially outwardly from the hub,
   (1) each flange having
      (a) a central annular rib protruding into the hub and (b) a bead extending radially outwardly from said rib;
   (2) said hub having
      (a) a cylindrical tape-receiving rim coaxial with each annular rib and abutting each flange,
      (b) an annular detent extending radially inwardly from each edge of said rim and interlocking with the bead of the adjacent flange,
      (c) annular means for supporting each flange along circles radially inward from said annular rib to cooperate with said interlocking beads and detents in maintaining the flanges essentially perpendicular to the tape-receiving rim, and
      (d) a web extending radially inwardly from the center of said rim to said flange-supporting means; and said ribs being sufficiently resilient that during assembly of the flanges to the hub, each rib deflects radially inwardly to allow its bead to by-pass and interlock with the detent.

4. A reel as defined in claim 3 wherein each flange has a central circular opening and said flange-supporting means consist of
   (i) an annular band connected to the radially inward extremity of said web and coaxial with said rim,
   (ii) means integral with said band for supporting one flange at its central opening flush with the edge of the band, and
   (iii) an annular partition coaxial with said rim and extending from one side of said web midway between said rim and band and formed with a peripheral notch into which the other flange fits at its central opening.

5. A reel as defined in claim 3 including adhesive at areas of contact between the hub and flanges.

References Cited

UNITED STATES PATENTS

| | | | |
|---|---|---|---|
| 3,088,689 | 7/1963 | Perlini | 242—71.8 |
| 3,229,928 | 1/1966 | Burgess et al. | 242—71.8 |

FRANK J. COHEN, *Primary Examiner.*

N. L. MINTZ, *Assistant Examiner.*